Feb. 6, 1968  W. S. NAGEL  3,367,461
RETARDER
Original Filed Feb. 16, 1966   7 Sheets-Sheet 2
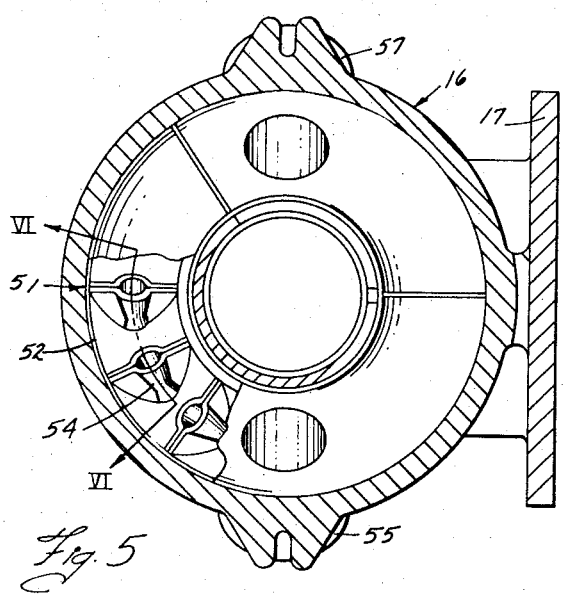
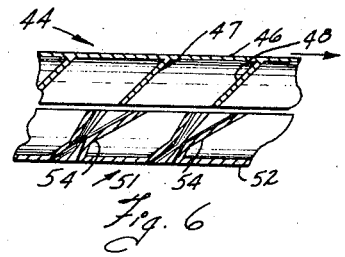
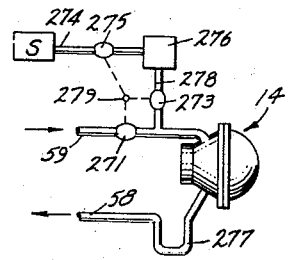
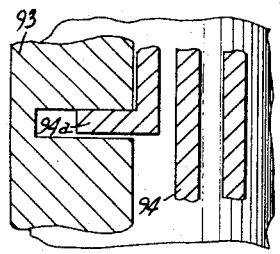
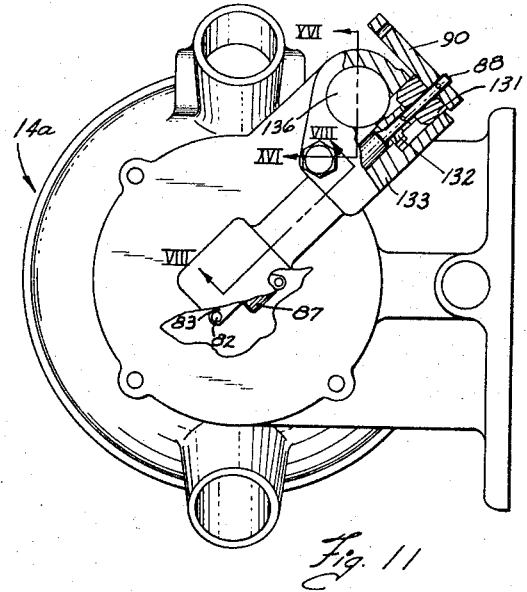
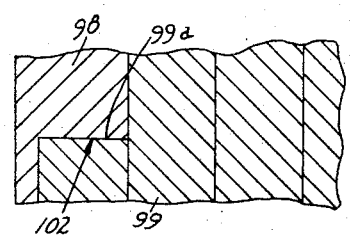
INVENTOR
WILLIAM S. NAGEL
BY
Woodhams, Blanchard & Flynn
ATTORNEYS Feb. 6, 1968 W. S. NAGEL 3,367,461

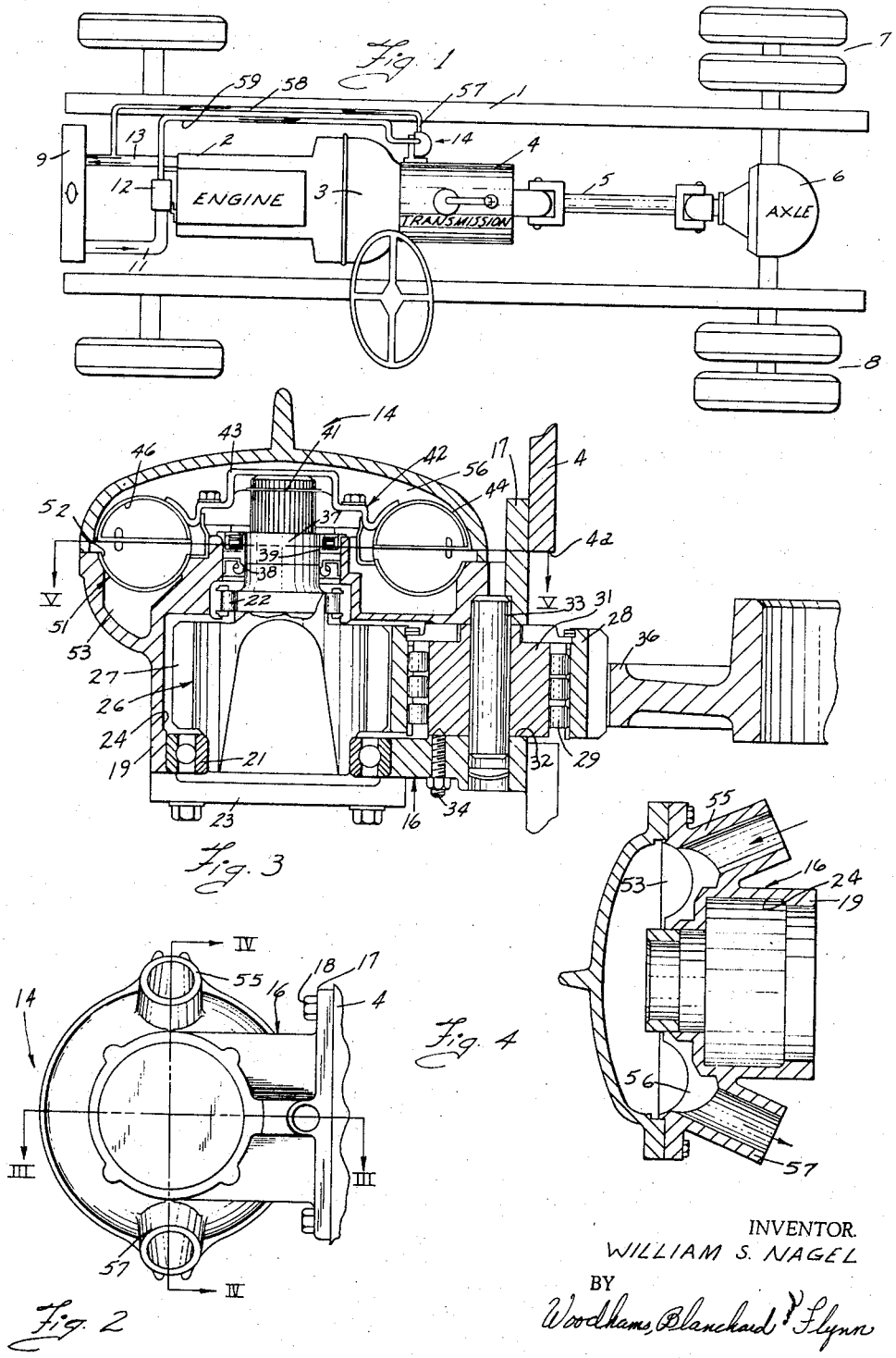

RETARDER

Original Filed Feb. 16, 1966 7 Sheets-Sheet 4

INVENTOR.
WILLIAM S. NAGEL
BY
Woodhams, Blanchard and Flynn
ATTORNEYS

Feb. 6, 1968   W. S. NAGEL   3,367,461
RETARDER
Original Filed Feb. 16, 1966   7 Sheets-Sheet 5

INVENTOR.
WILLIAM S. NAGEL
BY
Woodhams, Blanchard and Flynn
ATTORNEYS

Feb. 6, 1968  W. S. NAGEL  3,367,461
RETARDER

Original Filed Feb. 16, 1966  7 Sheets-Sheet 7

INVENTOR.
WILLIAM S. NAGEL
BY
Woodhams, Blanchard & Flynn
ATTORNEYS

United States Patent Office 3,367,461
Patented Feb. 6, 1968

3,367,461
RETARDER
William S. Nagel, Bloomfield Township, Mich., assignor to Eaton Yale & Towne Inc., a corporation of Ohio
Original application Feb. 16, 1966, Ser. No. 544,049. Divided and this application Aug. 29, 1966, Ser. No. 592,705
11 Claims. (Cl. 192—35)

ABSTRACT OF THE DISCLOSURE

A clutch device operable between first and second independently rotatable members wherein the first rotatable member is connected to one end of a spring member. The other end of the spring member is connected to one end of a torque transfer means. The second rotatable member has clutch means fixed thereto and a sleeve connected to said clutch means is located adjacent and radially between said spring member and said first rotatable member. The clutch device comprises a disconnectible engaging element actutable to connect the other end of the torque transfer means to the second rotatable member. Thus, engagement of said clutch applies a torque to said torque transfer means and thence to said spring member. This torsionally distorts said spring member sufficiently to cause same to contact said sleeve to effect a driving connection through said sleeve between said respective rotatable members.

---

This application is a division of my copending application Ser. No. 544,049, filed Feb. 16, 1966, which in turn is a division of my copending application Ser. No. 391,-827, filed Aug. 10, 1964, now Pat. No. 3,291,268, which in turn is a continuation-in-part of my application Ser. No. 306,131, now abandoned.

This invention relates to speed retarder units for motor vehicles and relates particularly to one intended for connection ahead of at least a position of the transmission gears of the vehicle and utilizing the vehicle cooling fluid for its energy absorption medium.

The usefulness of an effective and efficient energy-absorbing unit for motor vehicle use supplementary to the braking system thereof has been understood for a number of years and a variety of devices has been utilized for this purpose. Briefly, however, it may be said that speed retarder units are normally turbine devices connectible to the drive wheels of an automotive vehicle, usually by being connectible to same portion of the drive line of the vehicle, and are provided with means for absorbing energy from the rotor of said turbine and dissipating same as heat to the atmosphere.

More specifically, it has been understood for many years that the use solely of brakes for controlling the speed of a vehicle in hilly or mountainous terrain often overheats the linings and drums of said brakes and same will at best last for only a short period. This problem has long been commonly met in passenger car travel by connecting the engine in a substantially unpowered condition to the drive wheels of the vehicle in order to use the drag of the engine for assisting the brakes and preventing excessive vehicle speed.

Extending this same concept to heavier vehicles, such as trucks, retarder units of a number of different designs have been offered to the market. Most of these retarder units have been installed in the drive line of the vehicle, usually between the transmission and the differential gearing of the vehicle and in series with a suitably shortened drive shaft. In addition, at least one retarder unit has been designed for placement at the forward end of the vehicle transmission as an integral part thereof and operating in conjunction with the input gears of the transmission.

These units, insofar as I am aware, operate satisfactorily but they still present certain problems which it is the purpose of the present invention to correct. For example, where a unit is placed anywhere between the transmission and the drive wheels of the vehicle, it will run relatively slowly when the vehicle is going at a relatively slow speed. Since the effective braking torque developed by a turbine-type retarder increases as an exponential function of its speed, a retarder unit that is large enough for low-speed operation is excessive for high-speed operation, or conversely, a retarder unit that is correctly designed for higher-speed operation is totally inadequate when operated at low speeds. Thus, means should be provided for driving the retarder at a suitably high speed through a high ratio when the vehicle is going slowly but which will drive same at approximately the same speed through a low ratio when the vehicle is going rapidly.

To meet this problem, it has been proposed to place the retarder unit ahead of the transmission gearing, or at least ahead of a portion of the transmission gearing, whereby the transmission gears themselves provide the desired ratio above mentioned. Thus, at high speeds, with the transmission in direct drive, the retarder unit will be driven at a speed sufficient for its effective operation and at low vehicle speeds the transmission may be placed in its low-gear condition and the retarder unit is still driven at a sufficiently high speed to be effective.

However, in all of these units, the problem of withdrawing the absorbed energy from the unit has required special consideration. Where the units have been placed behind the transmission, they have normally utilized oil as the energy-absorbing medium and this has required a suitable heat exchanger for cooling the oil and usually a pump for insuring circulation of the oil between the retarder unit and the heat exchanger. All of this has added expense to the apparatus as well as inconvenience in the installation of same.

In the unit built as an integral part of, but at the forward end of, a transmission, the transmission lubricant is available for energy-absorbing purposes but this still requires means for cooling said lubricant and, hence, the necessity for a special heat exchanger, pump and appropriate connections is still present.

It has been suggested to avoid the necessity for a special heat exchanger and pump by connecting the retarder to the engine coolant system whereby to use the engine radiator and coolant pump for dissipating the heat developed in the retarder. However, this is not feasible for obvious reasons where the retarder unit is built into the transmission as an integral part thereof. Where the retarder unit is in the drive line of the vehicle, the connection to the engine radiator is mechanically feasible but the use of engine coolant, which is usually water, requires that the retarder unit be made of rust-resisting materials and in view of the relatively large size required of the retarder where it is placed in the drive line as above pointed out, the cost of same becomes excessive.

Accordingly, the objects of the invention include:

(1) To provide a retarder device for automotive use adaptable for use with the coolant system of the vehicle engine and connectible to the vehicle drive system at a point therein ahead of at least one pair of the transmission ratio gears.

(2) To provide a vehicle retarder, as aforesaid, which is sufficiently small as to be capable without excessive cost of being manufactured of relatively expensive, water-resistant, materials whereby to enable it to be connected to the vehicle engine cooling system.

(3) To provide a vehicle retarder system, as aforesaid, wherein the retarder can be connected as an accessory after the manufacture of the vehicle has otherwise been completed.

(4) To provide a vehicle retarder system, as aforesaid, wherein the additional mechanism required is small and inexpensive, may be applied to an otherwise completed vehicle quickly, easily and by mechanics of only ordinary training and skill and wherein the maintenance required to keep said retarder system in good operating condition is minimal.

(5) To provide a retarder system, as aforesaid, wherein the engine cooling radiator may function as the heat exchanger for dissipating unwanted energy from the retarder during the period in which the service of said radiator to the engine is not needed.

(6) To provide a retarder unit which can be rendered operative or inoperative as desired with only simple controls.

Other objects and purposes of the invention will be apparent to persons acquainted with apparatus of this general type upon reading the following disclosure and upon inspection of the accompanying drawings.

In the drawings:

FIGURE 1 is a schematic plan view of an automotive vehicle showing the manner of installing the retarder unit embodying the invention.

FIGURE 2 is an elevation of said retarder unit as seen from the side thereof which is forward with respect to the direction of vehicle operation.

FIGURE 3 is a section taken on the line III—III of FIGURE 2.

FIGURE 4 is a section taken on the line IV—IV of FIGURE 2.

FIGURE 5 is a view of the stator side of the apparatus as viewed somewhat along the line V—V of FIGURE 3 and looking in the direction of the arrows, and with all but a fragment of the rotor structure removed.

FIGURE 6 is a section taken on the line VI—VI of FIGURE 5.

FIGURE 7 is a modification of the control mechanism.

FIGURE 9 is an enlarged sectional view taken on the line IX—IX of FIGURE 8.

FIGURE 10 is an enlarged sectional view taken on the line X—X of FIGURE 8.

FIGURE 11 is an elevation of said modified retarder unit as seen from the side thereof which is forward with respect to the direction of vehicle operation.

FIGURE 22 is an enlarged fragmentary central cross-sectional view substantially as taken on the line XXII—XXII of FIGURE 19.

*Detailed description*

Figure 8:
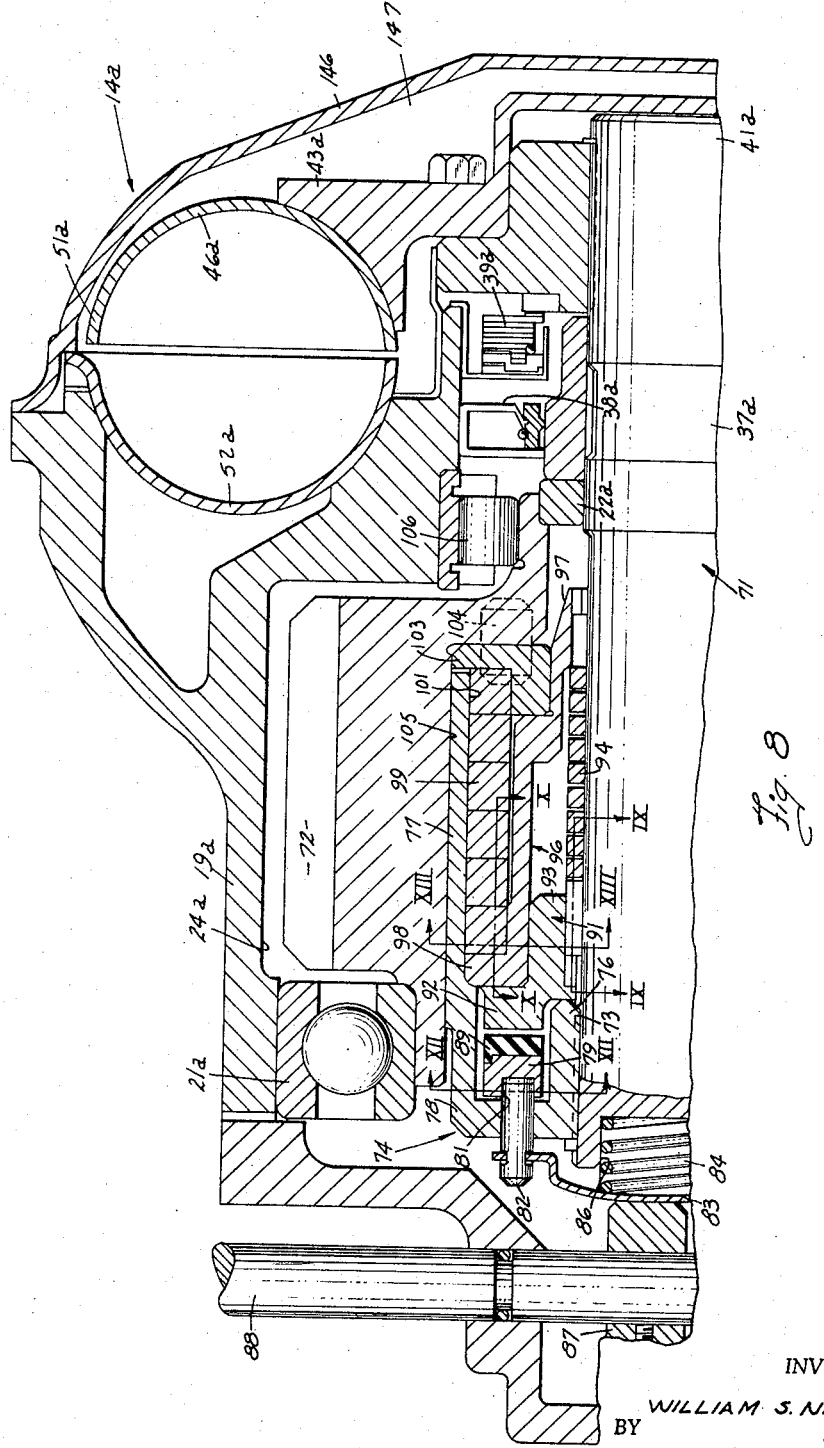
FIGURE 8 is an enlarged fragmentary central cross sectional view of a modified form of a retarder unit embodying the invention substantially as taken along the line VIII—VIII of FIGURE 11.

In the following description, certain terms will be used solely for convenience in description and will have no limiting significance, for example, the terms "upwardly" and "downwardly" will refer to directions taken with respect to the normal position of use of the retarder as shown in FIGURES 2 and 11. The terms "rightwardly" and "leftwardly" will be used with reference to particular drawings. The terms "inwardly" and "outwardly" will refer to directions toward and away from the geometric center of the apparatus. Said terms will also include derivatives of the words above specifically mentioned as well as other words of generally similar import.

Looking first at FIGURE 1, there is shown an automotive vehicle of any type having a frame 1, an engine 2 driving through a clutch 3 and transmission 4 to a propeller shaft 5 and thence through a differential 6 to drive wheels indicated generally at 7 and 8. A heat exchanger, or radiator, 9 is indicated as connected conventionally at the forward end of the vehicle and connected from its lower end by a conduit 11 to the water pump 12 which discharges into the lower end of the engine water jacket in the usual manner. A conduit 13 connects the upper end of the engine water jacket to the upper end of the radiator 9.

All of the foregoing is conventional and has been illustrated solely to assist in understanding the invention.

Turning now to the retarder unit itself, the same is indicated generally at 14 in FIGURE 1 and, as more fully illustrated in FIGURES 2 through 6, inclusive consists of a housing 16 having suitable means, as a flange 17, for mounting said unit by machine across 18 to the side of the transmission 4. Said housing 16 has a rotor chamber 24 (FIGURE 3) therewithin and includes a rotor-bearing support portion 19 arranged for supporting rotor bearings 21 and 22. Said bearings are of any conventional type and are supported in any convenient manner which will be readily apparent to those skilled in the art and therefore needs no detailing. A cover 23 closes the chamber 24.

A rotor 26 is supported by said bearings 21 and 22 and carries peripherally formed thereon suitable teeth 27 arranged for driving engagement with a drive gear 28. Said drive gear is carried by rollers 29 on an inner bearing race member 31 which is received into a drive chamber 32 in the housing 16. The inner bearing race member is held in place by a pin 33 and held against rotation by a suitable screw 34. The gear 28 meshes with any conveniently available gear 36 within the transmission housing, such as the head gear at the forward end of the transmission countershaft or a gear in the power take-off train. While it is preferable to select a connection to the transmission to have as many as possible of the transmission ratios between the gear 28 and the output of the transmission, at least some of the advantages of the invention can be obtained with less ratios between the gear 28 and the output of the transmission providing only that the gear 28 is positioned ahead of at least one of such ratios.

Extending from the portion of the rotor 26 which carries the teeth 27 is in this embodiment a portion 37 of reduced diameter which extends past an oil seal 38 and a water seal 39 and terminates in a splined portion 41. The turbine rotor 42 is fastened thereto and consists of a center plate 43 and blade means 44. Said blade means are formed in any convenient and conventional manner which in this embodiment consists of an annular trough-like element 46 of semi-circular cross section and containing a plurality of partitions of which two are shown at 47 and 48 (FIGURE 6). These positions are in this embodiment arranged angularly at about 45 degrees with respect to the general plane of the trough-like element 46 and are related to the direction of rotation of the rotor as indicated by the arrow in FIGURE 6. The stator 51 of the retarder unit comprises an annular trough-like element 52 which is similar to the trough-like element 46, is arranged in opposition thereto and is suitably fastened, such as by welding, to the housing 16.

Said stator has an annular inlet manifold 53 arranged adjacent therein which manifold communicates through the stator by a plurality of passageways formed therein of which one is indicated at 54. As shown in FIGURES 5 and 6, said passageways flair, both radially and circumferentially at each of their ends in order to obtain the most efficient fluid into the turbine structure in accordance with well known and accepted turbine-design techniques. A conduit 55 is formed in the housing 16 and connects with the interior of the annular manifold 53. Fluid entering the turbine enters through the conduit 55, thence through the several nozzles 54 (FIGURES 5 and 6) and against the flow aligners or partitions above mentioned. Braking fluid then discharges from the rotor means 42 at the outer periphery thereof into a chamber 56 which communicates with an outlet pipe 57.

In this device, the liquid braking fluid relationships of the rotor 42 and stator 51 are such that they will act somewhat as a pump whereby the liquid braking fluid is drawn into the system from the chamber 53 through the inlet passageways 54 and into the rotor 42. The partitions 47 and 48 align and direct the flow of said fluid thereby causing same to absorb energy with maximum efficiency from the mechanical means driving said rotor and said liquid is then expelled through the outlet 57.

Turning now to the remainder of this system, said outlet 57 is connected with a passageway which may be any convenient conduit 58 either flexible or rigid which is in turn connected to the inlet side of the radiator 9, such as by being connected to the high temperature engine conduit 13. The low temperature side of the radiator, such as a portion of the outlet of the pump 12 is connected by a conduit 59 to the inlet 55 of the retarder unit 14 and the circuit is complete.

The unit may be rendered operative or inoperative by any of several possible means. For example, one such control may be obtained by any conventional means (not shown) for connecting and disconnecting the gear 36 from the remainder of the transmission.

Alternatively, where said gear 36 is a constantly operating part of the transmission, as where it is a head gear on the transmission countershaft, then the rotor of the retarder 14 may operate continuously but the fluid flow therethrough may be interrupted. Referring to FIGURE 7, control means hereinafter described are shown as interposed into the supply line 59 and the discharge line 58. In this control means, the supply line 59 is shown with a valve 271 placed therein. The discharge line 58 from said retarder has flow-interrupting means located therein, which latter means may be a valve but is here shown as a trap 277. A source S of air under pressure connects through a line 274 and a valve 275 to a chamber 276 of fixed but relatively small size. The chamber 276 is then connected by a line 278 through a valve 273 to the line 59 at a point between the valve 271 and the retarder unit 14. Mechanical means generally indicated at 279 are preferably provided between the valves 271, 273 and 275 to facilitate their simultaneous operation, valves 271 and 275 being opened while valve 273 is closed, and vice versa. The volumetric capacity of the chamber 276 is related to that of the retarder unit 14 and the conduits connected thereto, as well as to the pressure available from the source S, in such a manner that the quantity of air admitted into said chamber 276 will be sufficient when the valves 271 and 275 are closed and the valve 273 is open to expand into the retarder 14 and drive the liquid therein to a point past the trap 277.

Operation

The operation of the apparatus has been somewhat indicated above but will be reviewed for the purpose of insuring complete understanding of the invention.

The gear 36 is assumed to be continuously operating so that the retarder unit is rendered operative or inoperative at the will of the operator by suitable manual control (not shown) of the valves 271, 273 and 275. The apparatus is placed in condition for operation by opening the valve 275 and closing the valve 273. With the mechanical valve operating system above described, this will also open the valve 271 so that if the engine is operating it will permit fluid to enter into the retarder 14. This, however, is immaterial at this point. The opening of the valve 275 and closing of the valve 273 permits air from the source S to enter into the chamber 276 and fill same to a predetermined pressure. The control 279 is now reversed and the valve 275 is closed, the valve 273 is opened and the valve 271 is closed. This permits air from the chamber 276 to enter into the retarder housing 16 and drive any liquid therein of said unit and past the trap 277. The rotor within said housing will now act only against the air therein and will accordingly run without load thereon and will impart no appreciable retarding torque into the running system of the vehicle. Thus, the vehicle may be operated in a normal manner.

However, when it is desired to render the retarder operative, the valve control 279 will be manually moved to reverse the valves 271, 273 and 275. This will permit coolant liquid to travel by the line 59 through the valve 271 and into the retarder unit 14, thence back through the line 58 to the radiator 9. The air previously within the retarder unit 14 will be carried by the coolant liquid as desired, but most conveniently to the radiator where it will bleed out by any suitable means (not shown) associated with the radiator. In the meantime, with the opening of the valve 275, a new charge of air under pressure is introduced into the chamber 276 in preparation for the next cycle of operation.

Introduction of liquid into the retarder 14 will permit the rotor therein to act against said liquid and impart energy thereto. Thus, liquid is drawn at a low-energy level from the return line 59, is accelerated by the rotor of the retarder 14 thereby drawing energy from the mechanical means driving said rotor and is impelled at a high-energy level into the line 58. Said high-energy level is manifested primarily as heat energy which is dissipated by the radiator 9.

It will be observed that the retarder will be used only when the engine is in, or substantially in, a loafing condition so that the use made of the radiator 9 by the retarder will be at such periods in the operation of the vehicle that only a small heat-dissipating action of the radiator will be required by the engine. Further, since the excess energy developed by the vehicle running downhill under gravity will be roughly equal to the energy rejected by the engine in driving the vehicle uphill, the capacity of the radiator 9, designed to dissipate engine-generated heat, will be sufficient to dissipate the mechanical energy converted by the retarder unit into heat energy.

Further, it will be recognized that by placing the retarder ahead of one or more sets of ratio gears in the transmission, when the vehicle is running at a fairly high speed and thereby the transmission is a high-speed gear ratio the retarder will operate at the desired high speed but when the vehicle is operating at a low speed, the transmission can be shifted into a low-speed ratio and the retarder will thereby still be caused to operate at the desired high speed with respect to the drive wheels of the vehicle. Thus, regardless of the speed of the vehicle, the retarder will operate at a high rotational speed, such as 2,500 r.p.m. at all times and it will accordingly operate at a high level of efficiency and effectiveness. Thus, it is possible for the retarder to be made of a small size regardless of the size of the vehicle with which it is to operate. For example, a retainer having a rotor of approximately six inches in diameter will be capable under ordinary conditions and by suitable gear ratio selection of developing approximately 200 horsepower for braking purposes regardless of the speed of the vehicle and this is ample for most purposes.

By making it possible for the retarder to be small, it now becomes economically feasible to make it of water-resistant materials, even though such materials are relatively expensive, and thus it becomes feasible to use the engine coolant as the energy absorbing and dissipating medium for the retarder. This in turn means that the only apparatus which will need to be applied to a vehicle to provide the desired retarding function is the retarder unit 14 itself, the relatively inexpensive conduits 58 and 59 and the retarder controls. This further reduces the cost of both the unit itself and the cost of installing same.

If the control over the operation of the retarder is exercised by connecting and disconnecting of the gear 36, the same operating characteristics and advantages above described will be equally obtainable, subject only to such inconvenience and/or expense as may exist incident to connecting and disconnecting the gear 36 from the remainder of the transmission.

*Modification of FIGURES 8–18*

Turning now to FIGURES 8 through 13, there is shown means for connecting and disconnecting the rotor of a retarder 14a to the gear 72 which may now be assumed to be continuously rotating whenever the output shaft of the transmission is rotating. In such case the valving shown in FIGURE 7 will be omitted and the lines 58 and 59, as shown in FIGURE 1, connected directly between the appropriate ports of the retarder unit 14a and the cooling system of the vehicle engine.

In FIGURE 8 a part of the housing structure and the rotor portions are the same as those shown in connection with FIGURES 1 through 7 and are identified by numerals corresponding to those used in connection therewith but further identified by the suffix "a." No further description of these elements will be needed.

In this modification there is provided a spindle 71 whose rightward end 37a (FIGURE 8) corresponds to the portion 37 appearing in FIGURE 3. Said spindle is supported within and by the gear 72 further described hereinafter, in part by the bushing 22a and in part by the clutch mechanism hereinafter described. Arranged onto said spindle by the splines 73 is a clutch fitting 74, said fitting comprising an inner short, cylindrical flange 76 which is splined to the splines 73 of the spindle, an outer long, also cylindrical, flange 77 and a radially positioned web 78 connecting said two flanges. A pressure equalizing ring 79 is arranged between the two flanges 76 and 77 and closely adjacent the web 78. A plurality, such as three, openings are provided therein of which one appears at 81 for the reception of a plurality of pins, such as the pin 82, said pins extending through said web 78 and being joined for simultaneous operation by a spider 83. Said spider and pins carried thereby are continuously urged leftwardly, as appearing in FIGURE 8, by a spring 84 within the axial bore 86 in the leftward end of the spindle 71. Any suitable mechanical means, such as a rotatable cam 87 mounted on and for rotation with a shaft 88 is provided for urging said spider 83 against the spring 84 and thereby urging said pins rightwardly. Any convenient means, partly indicated at 90 (FIGURE 11) are provided for enabling the operator to rotate the shaft 88.

A clutch ring 89 (FIGURE 8) is arranged on and for movement with the rightward face of the pressure equalizing ring 79. Said clutch ring 89 is preferably made of high-friction material, such as any of the many plastic- and fiber-materials made for this purpose.

An annular first energizing unit 91 is arranged next rightwardly of the clutch ring 89 and comprises a radial flange 92 arranged to bear against the clutch ring 89 and an axial cylindrical flange 93 which extends rightwardly from the flange 92. The first energizing ring 91 is arranged for free rotative movement with respect to the clutch fitting 74 and the friction ring 89. A relatively light first clutch spring 94 is wrapped around the spindle 71 and has one end 94a (FIGURE 9) anchored in the cylindrical flange 93 whereby rotation of the energizing ring 91 will initiate rotation of the clutch spring 94, the hand of said spring being such that the drag provided by subsequent connection to the turbine rotor 46a will effect a tightening of said spring 94 onto the spindle 71.

Telescoped over the spring 94 is a second energizing unit 96 whose rightward end is provided with an inwardly directed flange 97 and whose leftward end is provided with an outwardly directed flange 98. The rightward end of the spring 94 is anchored into the flange 97, as in a manner similar to end 94a (FIGURE 9), for rotation therewith. A second spring 99, preferably substantially larger than the first spring 94, is arranged within the annular chamber 101 defined between the flange 77 and the central portion of the energizing unit 96. Suitable means, as the step construction 102 (FIGURE 10) are provided for effecting positive engagement by the flange 98 against the end 99a of the spring 99 upon rotation of said second energizing unit 96. Similar means are provided for positively relating the rightward end of said spring 99 with a spring retainer 103. Said spring retainer 103 encircles said energizing unit 96 and is connected in any convenient manner, such as by a dowel pin 104, for rotation with the gear 72.

Turning now to further consideration of said gear 72, the same is provided with a central opening 105 which telescopes over the flange 77 and is supported at its leftward end in a bearing 21a and in its other end in a suitable bearing structure 106, whose inner rightward end embraces the outer and leftward surfaces of the bushing 22a.

The operation of the apparatus will be readily understood. When the cam 87 is in such position as to permit the spider 83 to move leftwardly under the urging of the spring 84, the clutch ring 89 does not engage the first energizing unit 91 and the parts are in nondriving relationship. Under these conditions, rotation of the gear 36 causes rotation of the gear 72 and this carries with it rotatingly the spring retainer 103, the spring 99, the second energizing unit 96, the spring 94 and the first energizing unit 91. The clutch fitting 74, clutch ring 89, pressure equalizing ring 79 and the parts associated therewith are rotatively fixed with respect to the spindle 71 and these parts do not rotate due to the lack of a driving tongue.

Under these conditions a vehicle on which the retarder is used may be operated in a normal manner and the retarder will be inoperative even though coolant liquid flows from the radiator 9 of the vehicle through the retarder 14a and then back to said radiator. However, when the operator of the vehicle desires to use the retarder as shown in FIGURES 8–13, he effects by any convenient means, as through the lever 90, rotation of the shaft 88 which rotates the cam 87 to urge spider 83 rightwardly against the spring 84. This effects rightward movement of the pressure-equalizing ring 79 and the clutch ring 89 to cause engagement thereof against the first energizing unit 91 for urging rotation thereof. The rotational torque thus applied to the first energizing unit 91 may be very light and in fact needs to be only sufficient to cause the leftward end of the relatively light spring 94 to engage the spindle 71. Since said spring is rotating relatively rapidly as above pointed out, and the spindle 71 is substantially nonrotating, a wide speed differential will exist therebetween so that even a relatively light touching of the leftward end of said spring 94 against said spindle will effect an extremely rapid wrapping and engagement of said spindle by said spring 94. The resistance to rotation of said spindle by its connection to the rotor 46a will restrain it against the rotation imposed onto it by its relationship with the gear 72 and thereby effect a relative rotational torque therebetween. This effects an expansion of the second spring 99 outwardly against the cylindrical flange 77 and effects an extremely tight engagement between said spring 99 and said flange 77.

This effects a driving relationship from gear 72 through pin 104 and spring retainer 103 through the spring 99 and flange 77 to the clutch fitting 74 and thence to the spindle 71. This will effect a satisfactory driving for certain uses, usually light uses, as pointed out in the modification referred to hereinafter. However, in the preferred embodiment of FIGURES 8–13, the flange 77 is very closely fitted into the central opening 105 and is preferably slotted as indicated at 111 (FIGURE 13) whereby upon expansion of the spring 99, the flange 77 is expanded firmly against the gear 72 to provide a solid and direct connection from the gear 72 through the clutch 74 to the spindle 71. Thus, a relatively light force momentarily imposed onto the shaft 88 will act as above set forth to create a connection between the gear 72 and the spindle 71 of sufficient torque-carrying capacity to carry the considerable load developed by the rotor 46a. Thus, the retarder unit 14a is rendered operative and its operation proceeds in the same manner as above described in connection with FIGURES 1 to 7, inclusive.

When it is desired to declutch or uncouple, the shaft 88 is rotated to move spider 83 leftwardly away from spring 84, thus allowing pressure-equalizing ring 79 and clutch ring 89 to move out of engagement with first energizing ring 91. The torsional characteristic of spring 94 is such that disengagement of clutch ring 89 from first energizing ring 91 allows spring 94 to unwind and thus become frictionally released from spindle 71.

Figure 14:
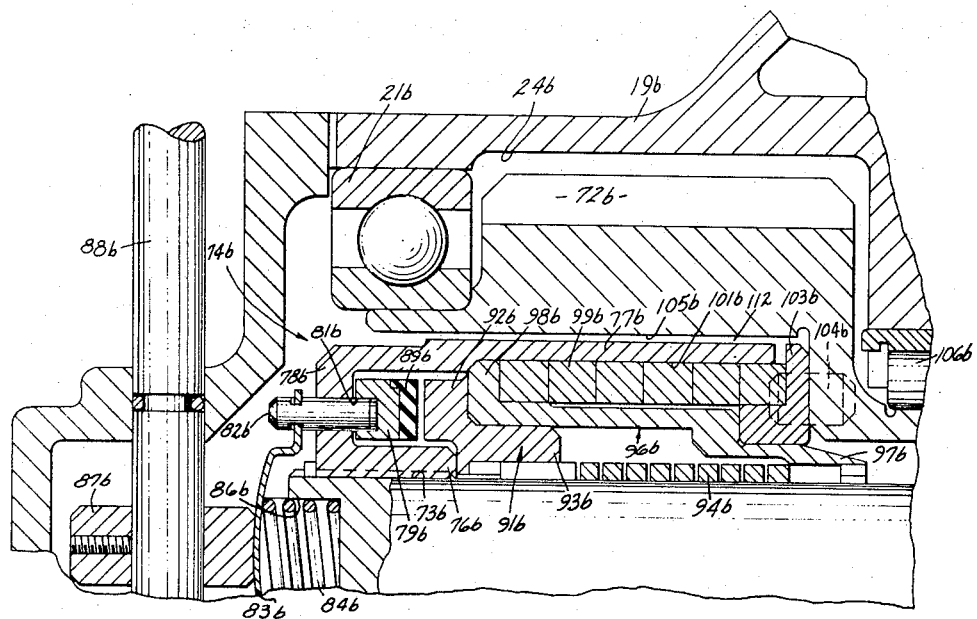
FIGURE 14 is a fragment of FIGURE 8 showing a modification thereof.
Figure 12:
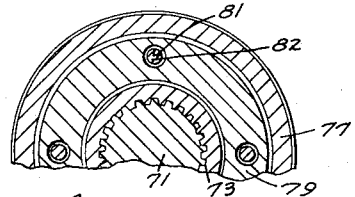
FIGURE 12 is a fragmentary sectional view taken on the line XII—XII of FIGURE 8.
Figure 15:
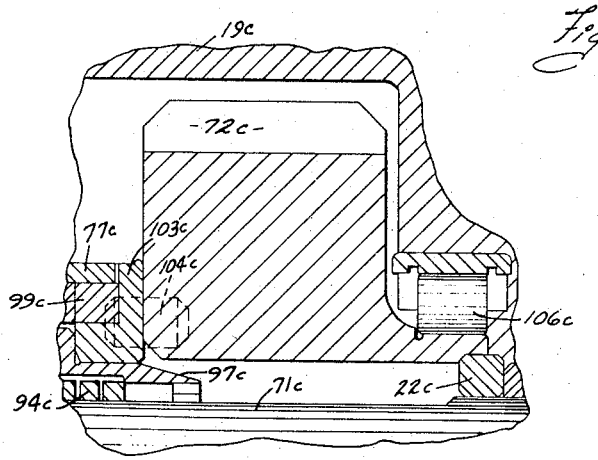
FIGURE 15 is a fragment of FIGURE 8 showing another modification thereof.
Figure 13:
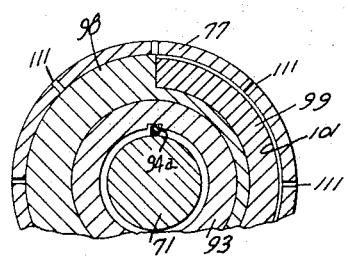
FIGURE 13 is a fragmentary sectional view taken on the line XIII—XIII of FIGURE 8.

Referring to FIGURE 14, there is shown a fragmentary view of the modification suggested above wherein the flange 77b is spaced from the inner surface of the gear 72 whereby the entire drive will be through the dowel pin 104b. In this modification the parts are all identical but the corresponding parts above described in connection with FIGURE 8 are referred to by the same numerals with the letter "b" added thereto. This will indicate that the parts are the same as above described in connection with FIGURES 8–13 excepting that, as shown in FIGURE 14, the slots 111 are omitted and an annular space indicated at 112b is provided. Thus, reliance is placed solely upon the pin 104b, and such additional counterparts thereof as may be provided, for effecting drive between the spring retainer 103b and the gear 72b which will be ample in certain circumstances and which will be advantageous where, if preferred, the gear 72b does not telescope flange 77b but instead is, for example, located entirely to the right of the spring retainer 103b as fragmentarily illustrated in FIGURE 13 wherein corresponding parts are numbered as in FIGURE 8 but with the letter "c" added thereto.

Figure 16:
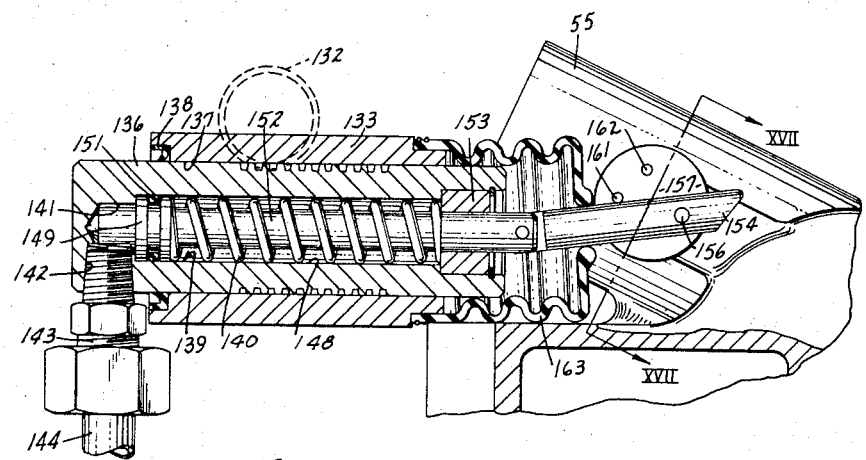
FIGURE 16 is an enlarged sectional view taken on the line XVI—XVI of FIGURE 11.
Figure 17:
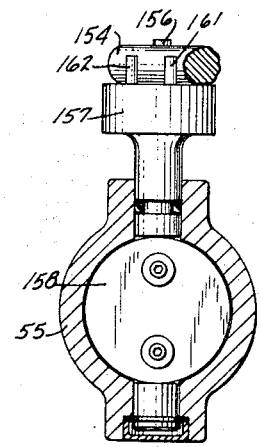
FIGURE 17 is a sectional view taken on the line XVII—XVII of FIGURE 16.
Figure 18:
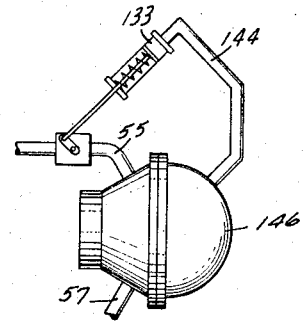
FIGURE 18 is a schematic diagram of a control system operable with the embodiment of FIGURE 16.

FIGURES 16, 17 and 18 disclose a modified control system for the retarder of FIGURES 8 through 13. The shaft 88 (FIGURE 11) is supported at the outward end thereof by a suitable bearing block 131 and has fixed thereto for rotation therewith a pinion gear 132 whereby a rotation of the lever 90 causes a corresponding rotation of the pinion gear 132. A gear case 133 fixed on the retarder housing 16 houses the pinion 132 and bearing block 131 and supports for reciprocation within a cylindrical central opening 137 (FIGURE 16) a preferably cylindrical rack 136. The pinion 132 drivingly engages the rack 136. In FIGURE 16 the pinion 132 is shown dottedly out of its normal position to indicate the engagement of said pinion 132 with the rack 136.

Suitable wiper means 138 in the outer (leftward in FIGURE 16) end of the gear housing 133 wipe the outer end of the rack 136 in a conventional manner to prevent entrance of foreign particles into the central opening 137. The rack 136 has a preferably coaxial central opening 139 through the inner (rightward as seen in FIGURE 16) end thereof.

The outer end of the opening 139 comprises a portion 141 of reduced diameter communicating through a suitable threaded opening 142, fitting 143, line 144 (FIGURE 18) and thence through the cover 146 (FIGURE 8) with the turbine chamber 147 defined thereby. Hence, an increase in pressure in the turbine chamber 147 will appear at the outer portion 141 of the central opening 139 (FIGURE 16).

Said portion 141 communicates with a midportion 148 of slightly increased diameter which houses a piston 149 having a sealing ring 151 thereon and an axially inwardly extending piston rod 152 connected thereto. The rod 152 extends out of the inward end of the central opening 139 in the rack 136. A slide block 153 closes the outward end of the central opening 139 and radially supports the piston rod 152 for axial sliding movement therethrough. A spring 140 lies within the central opening 139 and bears at one end upon the inner face of the piston 149 and the other end thereof upon the facing surface of the slide block 153 to bias the piston 149 outwardly (leftwardly in FIGURE 16). The piston rod 152 has an extension rod 154 pivotally secured to the inward end thereof which at its inner end is pivotally secured at 156 to the operating knob 157 (FIGURE 17) of a butterfly valve 158 which selectively opens and closes the inlet conduit 55 of the retarder upon proper operation of the knob 157. Suitable stop means, here the pins 161 and 162, control the limits of motion of the valve 158 by striking the adjacent edge surface of the extension arm 154. A suitable boot 163 of any convenient type prevents the inner end of the piston rod 152 from bringing foreign material in the central opening 139.

The butterfly 158 normally (FIGURE 17) lies in a position slightly behind its fully closed position and is thus at an angle of less than 90° to the longitudinal axis of the conduit 55. Due at least to the limit pin 161, the butterfly 158 cannot narrow this angle and can move only in the opposite direction through its closed position and further ahead to an open position, the angle of said open position with said longitudinal axis being determined by the limit pin 162. Also in the normal (FIGURE 16) position of the apparatus, the piston 149 is fully retracted within the rack 136 and the rack 136 is fully retracted, in the opposite direction, within the gear case 133. It will thus be seen that motion of either the rack 136 or piston 149 from their normal (FIGURE 16) positions will result in forces in opposed directions through the extension arm 154 and butterfly 158. In this manner, the motion of the piston rod 152 may be used to counteract the motion of the rack 136 to control the volume input of fluid to the retarder and to thereby control the amount and manner of application of decelerative torque to the vehicle by the retarder as detailed immediately hereinbelow.

Upon a suitable rotation of the shaft 88 by means of the lever 90 (FIGURE 11), the cam 87 on said shaft is rotated to move the spider 86 (FIGURE 8) and hence the ring 89 into frictional contact with the means 92 whereby to cause the rotor shaft 71 to become coupled to the gear 72 and hence to the drive train of the vehicle for retarding same. Such rotation of the shaft 88 rotates the pinion gear 132 which in turn moves the rack 136 outwardly from its normal (FIGURE 16) position for moving the butterfly 158 clockwise from its normal slightly open position of FIGURE 16 through a fully closed position and to a fully open position.

The initial rotation of the shaft 88 causes the retarder to couple to the vehicle drive train, as discussed hereinabove, and also rotates the butterfly 158 to its closed position to minimize fluid flow to the retarder turbine and minimize the pressure in the turbine chamber 147. At this point, then, the decelerative torque of the retarder is small and the connection of the retarder into the vehicle drive train takes place with a minimum of shock even though it occurs with the vehicle operating at a high speed. Thereafter, the power absorption of the retarder may be progressively increased, as set forth below, with the decelerative torque thus created likewise progressively increasing but remaining at all times under the constant control of the operator and without danger of sudden changes.

Further rotation of the shaft 88 causes further translation of the rack 136 to continue the clockwise (FIGURE 16) rotation of the butterfly 158 from its closed position. Hence, more fluid will be allowed into the input conduit 55 whereby turbine torque will increase and the retarder will tend to decelerate the vehicle more strongly. However, the pressure in the turbine chamber 147 will be increased by the increase in fluid flow and by an amount also dependent on the speed of the gear 72 and, hence, on vehicle speed, and said increase in pressure in the chamber 147 is applied through the line 144 to the outward end of the piston 149 moving same inwardly whereby the extension rod 154 tends to move the butterfly 158 in a closing or counterclockwise direction thus neutralizing, to an extent dependent on the speed of the vehicle, the inward movement of the rack 136. Thus, the line 144 and piston 149 comprise a negative feedback mechanism for reducing the effect of changes in vehicle speed and fluid pressure and temperature on the torque output of the retarder. As the speed of the vehicle decreases and the gear 72 turns less rapidly a retarder without this control would decrease its output torque. However, in the instant retarder, the pressure will drop in the chamber 147 and the spring 140 will thus urge the piston 149 leftwardly (FIGURE 16) whereby to open the butterfly 158 further to increase the flow of fluid through the input conduit 55 and thereby increase the efficiency of the retarder unit. Further, the operator may vary the decelerative torque at will by repositioning the rack 136 and hence butterfly 158 by rotation of the lever 90.

The embodiment of the invention hereabove described contemplates controlling the flow of fluid into the retarder unit through the input conduit 55. It has been found that throttling the outlet conduit 57 is unsatisfactory from at least two points of view. In the first place, the change in pressure within the turbine chamber 147 caused by throttling the output conduit 57 is small compared with the back pressure created by the turbine exhaust on the inner periphery of the turbine and hence the operating conditions of the turbine are changed in sufficiently by throttling of the output conduit 57 to significantly change the output torque thereof. In the second place, throttling of the exhaust conduit 57 lessens the exhaust flow from the turbine and hence lessens the amount of heat carried away from the turbine thereby possibly causing the turbine to overheat whereas the throttled inlet control system described hereinabove does not affect heat transfer from the turbine.

*Modification of FIGURES 19–22*

Figure 19:
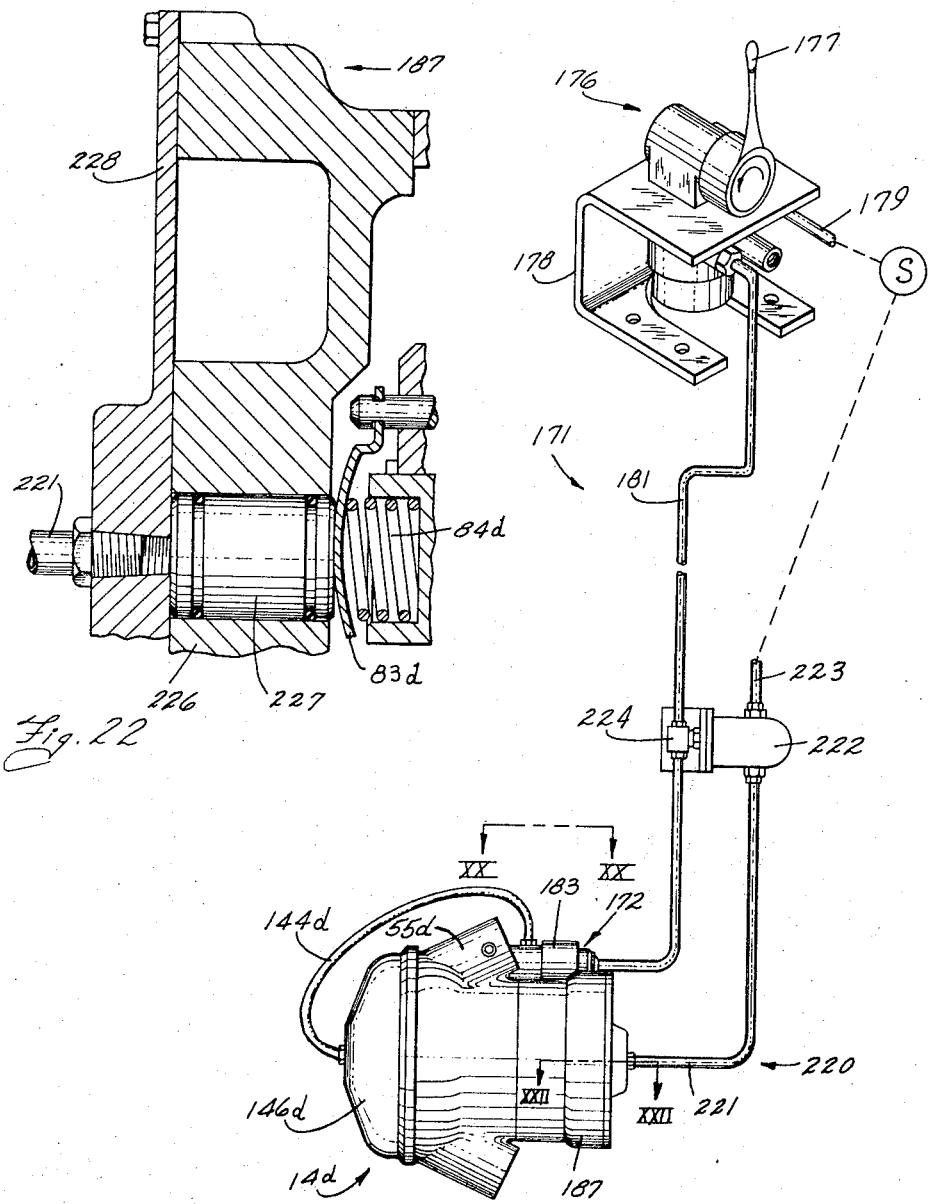
FIGURE 19 is a diagrammatic view of a modified control system operable with the retarder unit of FIGURE 8.
Figure 20:
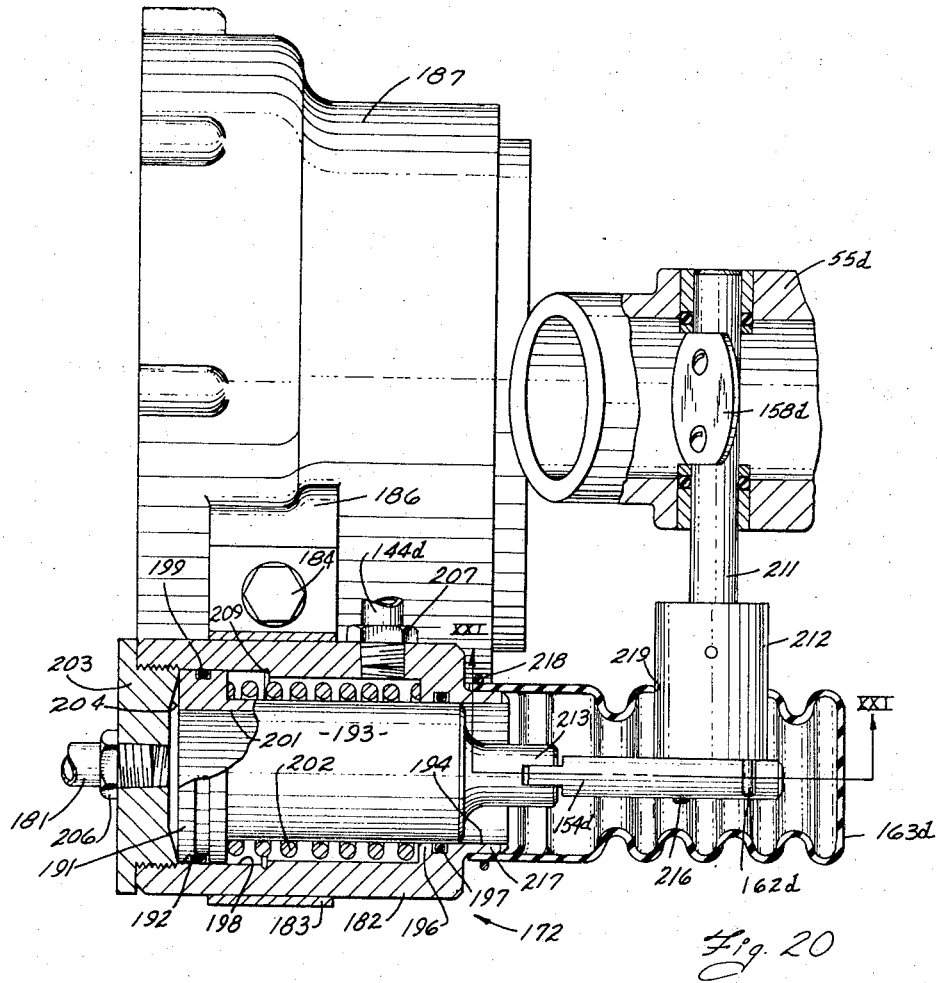
FIGURE 20 is an enlarged fragmentary partially broken sectional view substantially as taken on the line XX—XX of FIGURE 19.
Figure 21:
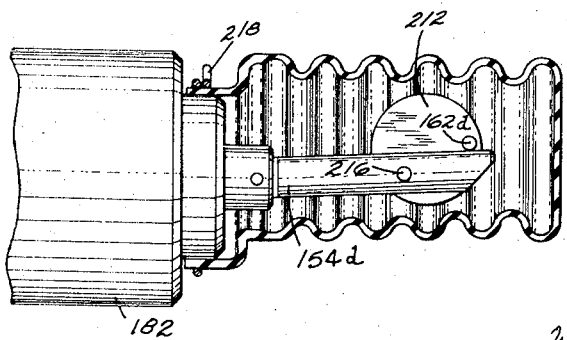
FIGURE 21 is a central cross-sectional view substantially as taken on the line XXI—XXI of FIGURE 20.

FIGURES 19, 20 and 21 disclose a further modified control system 171 for a retarder substantially similar, for example, to that of FIGURES 8 through 13. Parts of the apparatus discussed below which are similar to portions of the retarder and control system described above will be indicated by the same reference numerals the rods with the suffix "d" added thereto. The modified control system 171 (FIGURE 19) includes a control cylinder 172 mounted upon rightward (in FIGURE 19) end portion 187 of the retarder 14d adjacent the inlet conduit 55d. A conduit 144d connects the control cylinder 172 with the turbine chamber enclosed by the cover 146d for supplying fluid, and in the embodiment shown, liquid from within said turbine chamber thereto. A fluid pressure regulating valve 176 includes a manually operable handle 177 and is preferably mounted by any convenient means such as the mounting member 178 on the vehicle within reach of the vehicle operator. One side of the regulating valve 176 connects to a line 179 fed by a source S of fluid, preferably air, under pressure. A line 181 connects the other side of the valve 176 to the control cylinder 172. Thus, manipulation of the handle 177 of the regulating valve 176 will vary the air pressure supplied by the source S to the control cylinder 172.

The control valve 172 (FIGURE 20) includes a cylindrical housing 182 which is rigidly affixed by means of a strap 183 and screws, one of which is indicated at 184, to a buttress 186 on the periphery of the end portion 187. A piston 191 is reciprocable within the central opening 192 of the cylindrical housing 182. An elongated piston rod 193 is preferably integral with the piston 191 and extends rightwardly therefrom. A passage 194 communicates with the rightward end of the central opening 192 and is defined by an annular flange 196 which extends radially inwardly from the rightward end of the housing 182. The piston rod 193 snugly but slideably extends through the passage 194.

The piston rod 193 defines an annular liquid chamber 198 in the central opening 192 between the annular flange 196 and the piston head 191. An O-ring 197 is seated within a suitable annular groove in the passage 194 for bearing against the periphery of the piston rod 193 to seal the rightward end of the annular chamber 198. The periphery of the piston head 191 is annularly grooved for receiving an O-ring 199 which bears on the wall of the central opening 192 for sealing the leftward end of the chamber 198. In the particular embodiment shown, the piston 191 has a leftwardly opening central recess 201. A coil spring 202 substantially coaxially surrounds the piston rod 193 and is compressable between the piston head 191 and the annular flange 196 for urging the piston 191 leftwardly in the cylindrical housing 192. A cap 203 is threaded into the leftward and of the cylindrical housing 182 and defines with the piston 191 an air chamber 204. A fitting 206 connects the line 181 through the cap 203 to the air chamber 204. A fitting 207 connects the line 144d through the peripheral wall of the cylindrical housing 182 to the liquid chamber 198 adjacent the rightward end thereof. The central opening 192 is provided with a leftwardly facing step 209 between the fitting 207 and the cap 203 for limiting rightward movement of the piston 191.

A butterfly valve plate 158d is disposed within the leftward or inlet end of inlet conduit 55d for opening and closing said conduit. The plate 159d is affixed to a rotatable shaft 211 which extends substantially diametrically through the inlet conduit 55d substantially toward the central axis of the control cylinder 172 adjacent the rightward end (FIGURE 20) of said cylinder. A cylindrical block 212 affixed to the end of the shaft 211 lies adjacent said central axis of the control cylinder 172.

A preferably integral and coaxial stub 213 extends rightwardly from the piston rod 193 and is reduced in diameter with respect thereto. The end of the stub 213 pivotally supports the leftward end of the extension rod 154d. A pin 216 is affixed eccentrically to the end face of the block 212 and pivotally engages the intermediate portion of the extension rod 154d.

With the piston 191 in its leftwardmost position of FIGURES 20 and 21, the pin 216 is located above the central axis of the block 212 so that rightward movement of the piston 193 will result in counter-clockwise movement (as viewed in FIGURE 21) of the butterfly plate 158d. An eccentrically located stop pin 162d axially projects from the radial face of the block 212. When the valve 158d is closed as indicated in the drawings, said stop pin 162d bears upon the upper surface of the rightward end of the extension rod 154d to prevent clockwise (as seen in FIGURE 21) movement of the plate 158d from its closed position. Counter-clockwise rotation of the plate 158d past its fully opened position is prevented by contact between the shoulder 209 and the piston 191.

A flexible boot 163d telescopes over an axial flange 217 on the rightward end of the housing 182. The boot 163d is fixed in the flange 217 by any convenient means, here a conventional retaining ring 218. The boot 163d extends rightwardly from the housing 182 and loosely surrounds the stub 213 and extension shaft 154d. The block 212 extends through a sideward opening 219 in the boot 163d. The boot 163d protects the abovementioned linkage between the piston rod 193 and shaft 211 against dirt.

The control system 171 hereinabove described may, if desired, be used with the retarder 14 of FIGURES 8–13, the shaft 88 and cam 87 of the retarder 14 being retained for energizing the spider 83 and ring 89 to clutch the retarder 14 to the vehicle transmission. However, the control system 171 (FIGURE 19) may be used with clutch controlling means other than the aforementioned shaft 88 and cam 87 of FIGURE 8. More specifically, the control system 171 is particularly adapted to use with a fluid, preferably air controlled, clutch actuating system 220. The clutch actuating system 220 includes an air actuated displacement device which in the present embodiment of the invention comprises an air cylinder 226 (FIGURE 22) integral with the portion 187 of the retarder 14d. The inner end of a piston 227 bears on the spider 83d and is reciprocable in the cylinder 220 for actuating said spider to clutch the retarder 14d to the transmission. An air feed line 221 contacts through the end plate 228 of the portion 187 to the outer end of the cylinder 226 to supply air under pressure thereto for moving said piston and spider inwardly against the spring 84d. The air line 221 also connects a pressure valve 222. The pressure valve 222 is fed by the source S of air under pressure through a line 223. The line 181 connects to the pressure valve 222 by a fitting 224, the pressure valve 222 allowing flow therethrough to the line 221 and hence to the portion 187 upon appearance of air pressure in the line 181. Conversely, the pressure valve 222 shuts off air pressure from the source S to the retarder portion 187 when the regulating valve 176 is turned off and the pressure of the line 181 falls below its normal operating range. The clutching of the retarder 146d to the vehicle transmission is thus automatically accomplished by manipulation of the regulating valve 176 controlling the liquid input to the retarder.

Since the control system 171 will often be more conveniently used with actuating system 220, the operation of the control system 171 will be described in terms thereof. The butterfly plate 158d is normally held in its closed position by the leftward urging of the piston 191 by the spring 202. When the control system 171 is used with the clutch actuating system 220, initial opening to the regulator valve 176 energizes the pressure valve 222 for clutching the retarder 14d to the vehicle transmission. The pressure in line 181 required to initiate compression of the spring 202 by the piston 191 is preferably greater than that required to actuate the pressure valve 222. Thus, the retarder 14d will be clutched to the vehicle transmission before the initial opening of the butterfly 158d occurs. Further opening of the regulator valve 176 sufficiently pressurizes the air chamber 204 via line 181 as to cause an initial rightward displacement of the piston 191. As a result, the butterfly plate 158d pivots (in a counterclockwise direction as seen in FIGURE 20) to allow liquid to flow at a restricted rate into the retarder 14d through the inlet conduit 55d. Since the retarder 14d is now clutched to the vehicle transmission, said retarder 14d retards the vehicle. Thus, a gradual opening of the regulator valve 176 results in a smooth increase from zero of the retarding torque exerted by the retarder 14d.

Were the butterfly plate 158d controlled only by the regulator valve 176, liquid pressure in the turbine chamber and in the liquid chamber 198 would tend to increase with increasing vehicle speed thereby producing excessive retarding torque at high engine speeds and/or insufficient torque at low speeds. The present control system overcomes this tendency by reducing torque at high speeds while maintaining useful torque output at low speeds so that torque output is substantially at the same magnitude at high and low speeds. This result is achieved in the present system by using the aforementioned tendency for pressure in the turbine chamber to increase with an increase in speeds. More specifically, the line 144d maintains liquid in the annular liquid chamber 198 of the control cylinder 172 at the same pressure as the liquid in the turbine chamber. The pressurized liquid in the liquid chamber 198 acts with the spring 202 to resist rightward movement of the piston 191 urged by the air pressure in the air chamber 204 and, hence, opening of the butterfly plate 158d. Thus, at high enginge speeds, the plates 191 will open the butterfly plate by a lesser amount than would normally be the case in the presence of a given air pressure in the air chamber 204. As a result, less liquid will be admitted to the retarder past the butterfly plate 158d at high engine speeds, the resulting retarding torque of the retarder 14d thereby being reduced.

At low engine speeds, the liquid in the turbine chamber and the liquid chamber 198 is relatively low and the air pressure on the leftward end of the piston 191 is chiefly opposed by the spring 202. The butterfly plate 158d may therefore be opened more by a given air pressure in the air chamber 204 for admitting more liquid to the turbine chamber. This tends to bolster retarder torque output at low speeds so the retarder torque output will be substantially similar at high and low engine speeds.

Increased opening of the regulating valve 176 increases the air pressure in the air chamber 204 so that the piston 191 opens the butterfly plate 158d and so increases retarding torque. The rightward limit of the piston 191 corresponds to the fully opened position of the butterfly plate 158d.

While particular retarder designs have been described somewhat in detail herein for the purpose of making a complete disclosure of the preferred embodiments, it will be recognized that such specific retarder designs, while useful and believed to be novel by themselves, are only representative of many designs which can be used within the scope of the general system herein described and the broader aspects of the invention will be recognized as embracing other forms of retarder units as desired.

In addition, there are other individual features of the apparatus herein specifically disclosed which are set forth for convenience of description only and will be recognized as subject to variations as needed to meet the desires of the individual designer or the individual installation.

Accordingly, such variations will be recognized as within the scope of the hereinafter appended claims, excepting as said claims specifically require otherwise.

What is claimed is:

1. A clutch device operable between first and second independently rotatable members, comprising in combination:
   first resilient means and means driven by said first rotatable member for rotatably driving one end of said first resilient means;
   torque transfer means and means for rotatably driving same at one end thereof by the other end of said first resilient means;
   clutch means one side of which is fixed for rotation with said second rotatable member and having a sleeve portion thereof located adjacent and surrounding said first resilient means;
   disconnectible engaging means actuatable to engage the other end of said torque transfer means for connecting same to said second rotatable member.
   whereby actuation of said disconnectible engaging means connects said other end of said torque transfer means to said second rotatable member which applies a torque between the ends of said torque transfer means, and said torque transfer means in resisting the rotation imposed upon it by said first resilient means torsionally distorts said first resilient means sufficiently to cause same to contact the other side of said clutch means to effect a driving connection through said clutch means between said respective rotatable members.

2. The device defined in claim 1 wherein said first rotatable member is telescoped over said second rotatable member for defining an annular space therebetween and wherein said first resilient means, said torque transfer means, and the sleeve portion of said clutch means are all in telescoped relationship to each other and located at least substantially within said annular space.

3. A clutch device operable between first and second independently rotatable members, comprising in combination:
   resilient means and means driven by said first rotatable member for driving engagement with a first point on said resilient means for effecting rotation of said resilient means;
   energizing means and means for rotatably driving same from a second point on said resilient means spaced from said first point;
   clutch means, one side of which is fixed with respect to said second rotatable member;
   a sleeve portion fixed with respect to said second rotatable member and located adjacent and surrounding said resilient means;
   engagement means actuable to couple said energizing means to said second rotatable member;
   whereby actuation of said engagement means connects said engagement means to said second rotatable member which applies a torque between the ends of said resilient means and as said energizing means resists the rotation imposed thereon by said resilient means the same torsionally distorts said resilient means sufficiently to cause same to effect driving connection with the other side of said clutch means to effect a like driving connection between said first rotatable member and said second rotatable member through said clutch means.

4. The device defined in claim 3 wherein said first rotatable member is telescoped over said second rotatable member for defining an annular space therebetween and wherein said resilient means, said energizing means, and said sleeve portion are all in telescoped relationship to each other and located at least substantially within said annular space.

5. A clutch device operable between a first rotatable member and a second rotatable member, comprising in combination:
   first resilient means and means driven by said first rotatable member for rotatably driving one end of said first resilient means;
   first energizing means and means for drivingly engaging the same with the opposite end of said first resilient means;
   second resilient means, one end of which is drivingly engaged with said first energizing means, said second resilient means being weaker than said first resilient means;
   second energizing means and means for drivingly engaging same with the opposite end of said second resilient means;
   clutch means, one side of which is fixed for rotation with said second rotatable member;
   disconnectible engaging means actuable to engage said second energizing means with said second rotatable member;
   whereby actuation of said disconnectible engaging means connects said second energizing means with said second rotatable member which applies a torque between the ends of said second resilient means and as said second energizing means resists the rotation imposed upon it by said second resilient means it torsionally distorts said second resilient means sufficiently to cause same to effect a limited driving connection with the other side of said clutch means to effect a like driving connection between said first rotatable member and said second rotatable member and as said second resilient means resists rotation imposed upon it by said first energizing means it torsionally distorts said first resilient means to effect a maximum driving connection with the other side of said clutch means to effect a like driving connection between said first rotatable member and said second rotatable member through said clutch means.

6. The device defined in claim 5 wherein said first rotatable member is telescoped over said second rotatable member for defining an annular space therebetween and wherein said first resilient means and said second resilient means are in telescoped relationship to each other and said first energizing means is disposed therebetween in telescoped relationship, the first and second resilient means and the first energizing means being located at least substantially within said annular space.

7. The device defined in claim 6 wherein said clutch means includes an inner flange which is drivingly engaged with said second rotatable member and an outer flange which is telescoped between said first rotatable member and said first resilient means;
   whereby torsional distortion of said first resilient means causes same to contact said outer flange of said clutch means to effect the complete driving connection between said first rotatable member and said second rotatable member.

8. The device defined in claim 7 wherein said outer flange is disposed closely adjacent the inner surface of said first rotatable member and has a plurality of longitudinal slots;
   whereby distortion of said first resilient means produces expansion of said outer flange thereby producing a driving connection between said first rotatable member and said outer flange as well as the driving connection between said first resilient means and said outer flange.

9. The device defined in claim 7 wherein said outer flange is spaced from the inner surface of said first rotatable member;
   whereby torsional distortion of said first resilient means effects a complete driving connection between said first resilient means and said outer flange.

10. A clutch device as defined in claim 5 wherein said disconnectible engaging means comprises:
    a clutch pressure plate and spring means, said plate being urged into disengagement by said spring means;
    rotatable camming means capable of overcoming said spring means thereby urging said clutch pressure plate into driving engagement with said second energizing means.

11. A clutch device operable between first and second independently rotatable members, comprising in combination:
    first drive means rotatably driven by said first rotatable member;
    first resilient means having one end coupled to said first drive means for being rotatably driven thereby;
    first torque transfer means and means for rotatably driving same from the other end of said first resilient means;
    second resilient means and means for rotatably driving same at one end thereof from said first torque transfer means;
    second torque transfer means and means for rotatably driving same by the other end of said second resilient means;
    engaging means for drivingly connecting said second rotatable member to said second torque transfer means;
    actuating means for operating said engaging means whereby actuation of said actuating means connects said engaging means with said second torque transfer means thereby applying a torque between the ends of said second resilient means and as said second resilient means resists the rotation imposed upon it by said first torque transfer means it torsionally distorts said second resilient means sufficiently to cause same a limited driving connection between said first rotatable member and said second rotatable member and as said first resilient means resists the rotation imposed upon it by said first rotatable member it torsionally distorts said first resilient means sufficiently to cause same to effect a stronger driving connection between said first rotatable member and said second rotatable member, as said second rotatable means resists the rotation imposed upon same by said first drive means, said first drive means forms a complete driving connection between said first rotatable member and second rotatable member.

References Cited

UNITED STATES PATENTS 2,959,986  11/1960  Irgens et al. _____ 192—415 X

DONLEY J. STOCKING, *Primary Examiner*

ARTHUR T. McKEON, *Examiner.*